United States Patent
Yasui (10) Patent No.: US 9,531,909 B2
(45) Date of Patent: Dec. 27, 2016

(54) COMMUNICATION APPARATUS AND COMMUNICATION SYSTEM

(71) Applicant: KYOCERA Document Solutions Inc., Osaka-shi, Osaka (JP)

(72) Inventor: Yoshiaki Yasui, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/336,506

(22) Filed: Jul. 21, 2014

(65) Prior Publication Data
US 2015/0029562 A1 Jan. 29, 2015

(30) Foreign Application Priority Data
Jul. 29, 2013 (JP) .................................. 2013-156383

(51) Int. Cl.
*H04N 1/00* (2006.01)
*H04N 1/327* (2006.01)

(52) U.S. Cl.
CPC ...... *H04N 1/32789* (2013.01); *H04N 1/00217* (2013.01); *H04N 2201/0094* (2013.01)

(58) Field of Classification Search
CPC ................... H04N 1/00127; H04N 2201/0034; H04N 1/32789; H04N 1/00217; H04N 2201/0094
USPC ................................. 358/1.15, 468
See application file for complete search history.

(56) References Cited

U.S. PATENT DOCUMENTS

| | | | | |
|---|---|---|---|---|
| 2001/0048533 | A1* | 12/2001 | Koana | G06F 3/1204 358/1.15 |
| 2006/0007486 | A1 | 1/2006 | Tanimoto | |
| 2008/0174826 | A1* | 7/2008 | Fujino | 358/3.03 |
| 2009/0015711 | A1* | 1/2009 | Yamamoto | H04N 7/186 348/441 |
| 2009/0122373 | A1* | 5/2009 | Okamoto | H04N 1/00442 358/539 |
| 2009/0244607 | A1* | 10/2009 | Sako | 358/1.15 |
| 2010/0149600 | A1 | 6/2010 | Tanimoto | |
| 2011/0098086 | A1* | 4/2011 | Nagata | H04M 1/21 455/557 |
| 2012/0016813 | A1 | 1/2012 | Ohara | |
| 2013/0150038 | A1* | 6/2013 | Efrati et al. | 455/436 |

FOREIGN PATENT DOCUMENTS

| | | |
|---|---|---|
| JP | 2001-236274 | 8/2001 |
| JP | 2005-086397 | 3/2005 |
| JP | 2006-25176 | 1/2006 |
| JP | 2012-23569 | 2/2012 |

* cited by examiner

Primary Examiner — Iriana Cruz
(74) Attorney, Agent, or Firm — Gerald E. Hespos; Michael J. Porco; Matthew T. Hespos (57) ABSTRACT

A communication apparatus according to the present disclosure includes a communication control section and a sending control section. The communication control section performs facsimile communication by way of an IP network. The sending control section performs connection confirmation processing of controlling the communication control section to send connection confirmation data in the form of image data for confirming connection to a receiving communication apparatus which the facsimile communication is directed to, and determining whether reception information indicating reception of the connection confirmation data has been sent back from the receiving communication apparatus, before sending target sending image data via the facsimile communication.

10 Claims, 4 Drawing Sheets

COMMUNICATION APPARATUS AND COMMUNICATION SYSTEM

This application is based on Japanese Patent Application No. 2013-156383 filed with the Japan Patent Office on Jul. 29, 2013, the contents of which are hereby incorporated by reference.

BACKGROUND

The present disclosure relates to a communication apparatus and a communication system which perform facsimile communication by way of an IP (Internet Protocol) network and, in particular, to a technology of sending image data via facsimile communication.

Conventionally, there are known communication apparatuses such as G3 (Group 3) facsimile apparatus which performs facsimile communication in accordance with a communication procedure based on the ITU-T Recommendation T.30 by way of a telephone network, communication apparatus which sends and receives an email in accordance with a communication procedure based on the ITU-T Recommendation T.37 by way of an IP network, and network facsimile apparatus which performs facsimile communication in accordance with a communication procedure based on the ITU-T Recommendation T.38 by way of an IP network.

Specifically, a network facsimile apparatus is known which has an email processing function of sending and receiving image data via email by way of a local area network, and a sending function of sending image data in accordance with the G3 facsimile transmission procedure by way of an analog public network. It is also known that a sending apparatus which has sent image data via email sends email requesting cancelation of the previous image data sending, and the receiving apparatus deletes the image data which is being requested for cancelation if it remains in a mailbox.

A G3 facsimile apparatus makes a call by way of a telephone network, and confirm normal communication to be possible after receiving a response from the receiving facsimile apparatus, and then starts sending of image data.

SUMMARY

A communication apparatus according to the present disclosure includes a communication control section and a sending control section. The communication control section performs facsimile communication by way of an IP network. The sending control section performs a connection confirmation processing of controlling the communication control section to send connection confirmation data in the form of image data for confirming connection to a receiving communication apparatus which the facsimile communication is directed to, and determining whether reception information indicating reception of the connection confirmation data has been sent back from the receiving communication apparatus, before sending target sending image data via the facsimile communication.

These and other objects, features and advantages of the present disclosure will become more apparent upon reading the following detailed description along with the accompanying drawings.

DETAILED DESCRIPTION

Figure 1:
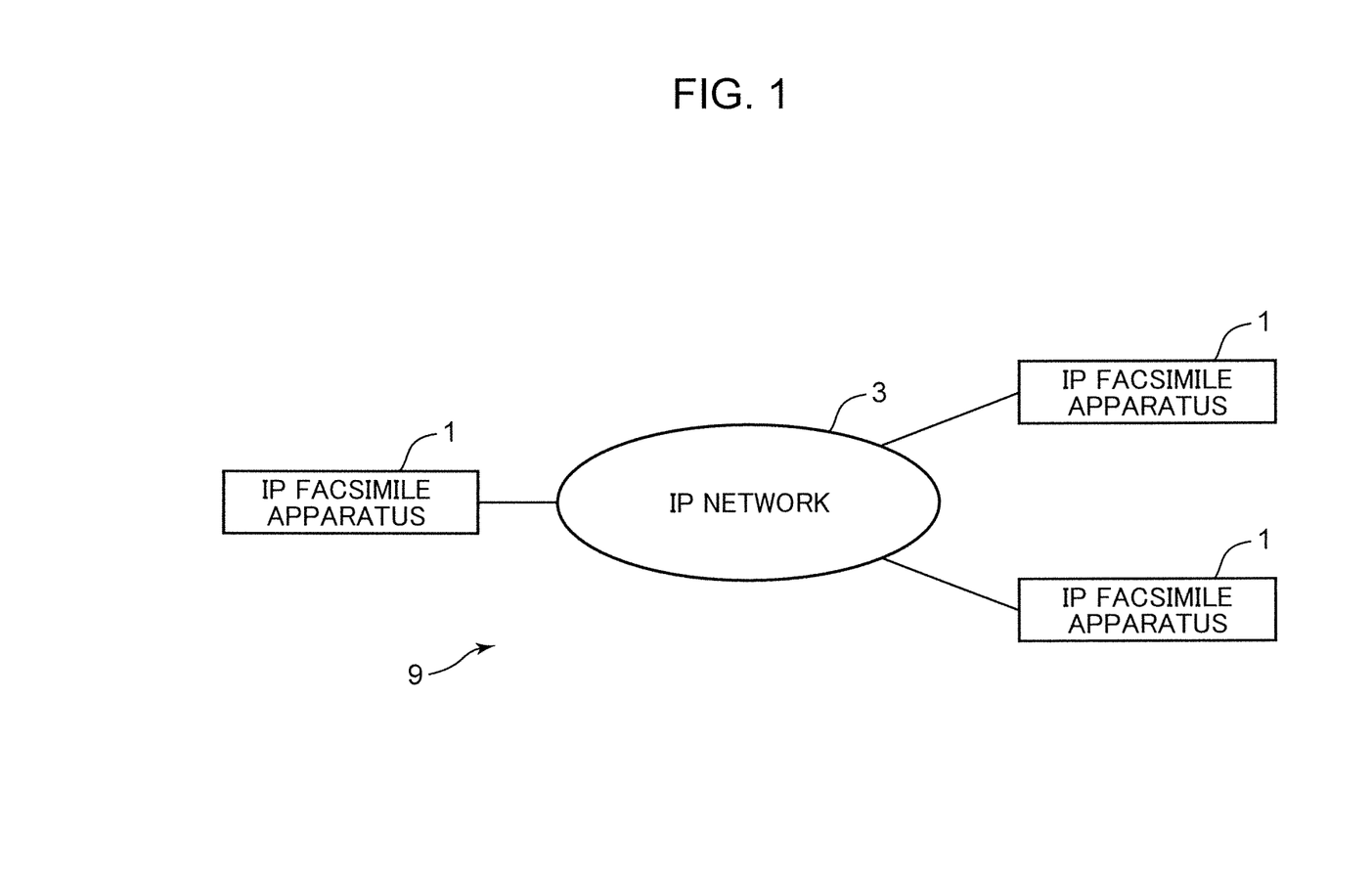
FIG. 1 is a schematic configuration diagram of an IP facsimile communication system of an embodiment of a communication system according to the present disclosure.

Hereinafter, an embodiment of a communication apparatus and a communication system including the communication apparatus according to the present disclosure will be described. FIG. 1 is a schematic configuration diagram of an IP facsimile communication system 9 of an embodiment of a communication system according to the present disclosure.

As shown in FIG. 1, the IP facsimile communication system 9 includes IP facsimile apparatuses 1 (communication apparatus) connected to an IP (Internet Protocol) network 3 such as Internet and LAN (Local Area Network).

In the IP facsimile communication system 9, an IP facsimile apparatus 1 (sending communication apparatus) and an IP facsimile apparatus 1 (receiving communication apparatus) that is independent of the former IP facsimile apparatus 1 perform facsimile communication therebetween in accordance with a communication procedure based on the ITU-T Recommendation T.38 via the IP network 3.

Figure 2:
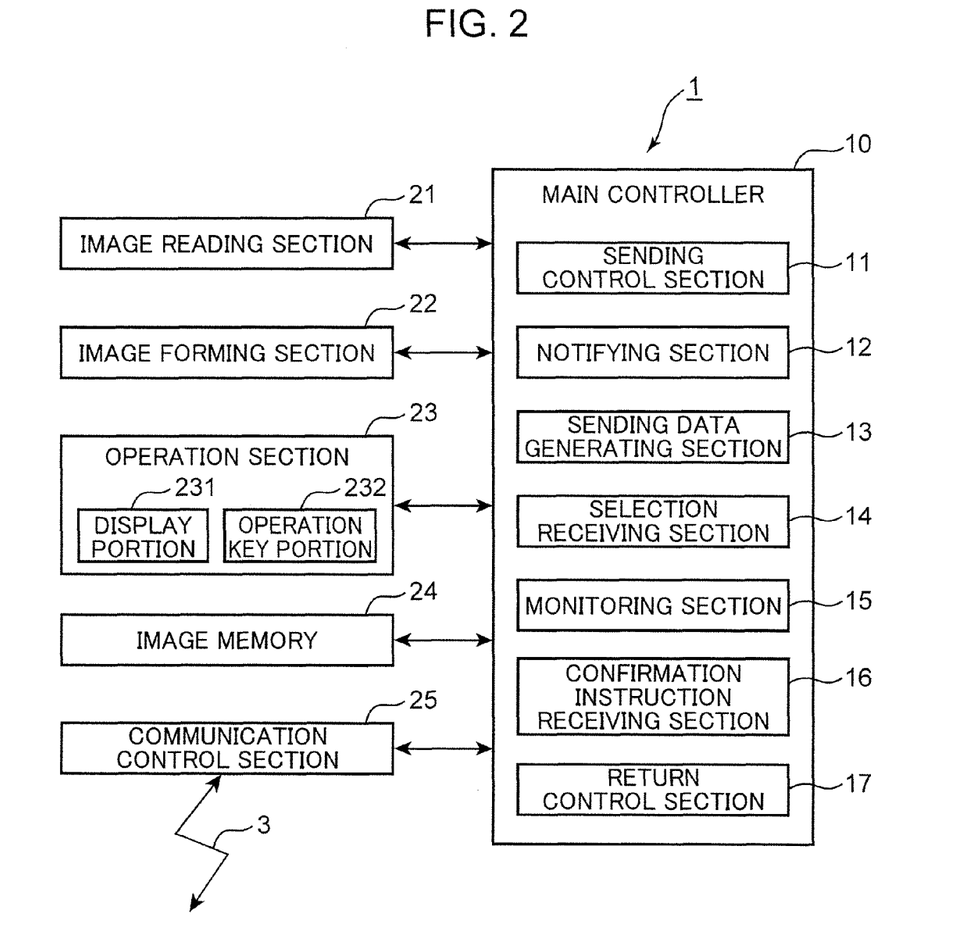
FIG. 2 is a block diagram showing an electrical configuration of an IP facsimile apparatus of an embodiment of a communication apparatus according to the present disclosure.

FIG. 2 is a block diagram showing an electrical configuration of the IP facsimile apparatus 1 of the embodiment of the communication apparatus according to the present disclosure. As shown in FIG. 2, the IP facsimile apparatus 1 includes an image reading section 21, an image forming section 22, an operation section 23, an image memory 24, a communication control section 25, and a main controller 10.

The image reading section 21 includes an unillustrated optical system unit disposed at a position opposite an upper surface of an unillustrated apparatus main body. The optical system unit includes a CCD (Charge Coupled Device) line sensor, an exposure lamp, and the like. The optical system unit is movable along the upper surface of the apparatus main body by an unillustrated driving section. The optical system unit is allowed to move along the upper surface of the apparatus main body at a position opposite the upper surface to scan an image of a document placed on the upper surface and output acquired image data to the main controller 10.

The image forming section 22 can form an image on a sheet of paper on the basis of image data received from another IP facsimile apparatus 1 via the IP network 3. Specifically, the image forming section 22 includes, as known in the art, a photoreceptor drum, a charging portion disposed opposite a peripheral surface of the photoreceptor drum, an exposure portion disposed downstream from the charging portion and opposite the peripheral surface of the photoreceptor drum, a developing portion disposed downstream from the exposure portion and opposite the peripheral surface of the photoreceptor drum, a cleaning portion disposed downstream from the developing portion and opposite the peripheral surface of the photoreceptor drum, and the like.

The operation section 23 includes a display portion 231 for displaying information, and an operation key portion 232 for allowing a user to input various operation instructions. The display portion 231 includes a liquid crystal display having a touch panel function, for example, and displays various kinds of information. The operation key portion 232 includes various types of keys such as start key for instructing starting of execution of a function such as facsimile communication, and a numerical keypad.

The image memory 24 includes a memory such as RAM (Random Access Memory) and flash memory. The image memory 24 stores image data read by the image reading section 21. The image memory 24 also stores image data received from another IP facsimile apparatus 1 via the IP network 3.

The communication control section 25 is connected to the IP network 3. The communication control section 25 sends and receives data packets to and from an external apparatus such as personal computer connected to the IP network 3 in accordance with a communication standard such as 100/1000 Base-T. For example, the communication control section 25 sends and receives data packets conforming to the T.38 in accordance with the communication procedure based on the T.38 via the IP network 3, the data packets including image data. In this manner, the communication control section 25 controls the facsimile communication with another IP facsimile apparatus 1 by way of the IP network 3.

The main controller 10 includes, for example, an unillustrated CPU (Central Processing Unit) which performs predetermined arithmetic processing, an unillustrated non-volatile memory such as EEPROM (Electrically Erasable and Programmable Read Only Memory) where a predetermined control program is stored, an unillustrated RAM (Random Access Memory) for temporarily storing data, and peripheral circuits. The main controller 10 performs various kinds of processing by executing the control program stored in the non-volatile memory or the like by the CPU to thereby control respective operations of the sections of the IP facsimile apparatus 1.

To cause the communication control section 25 to perform the facsimile communication by way of the IP network 3, the main controller 10 includes a sending control section 11, a notifying section 12, a sending data generating section 13, a selection receiving section 14, a monitoring section 15, a confirmation instruction receiving section 16, and a return control section 17.

In the present embodiment, description will be made about operations of the main controller 10, specifically the sending control section 11, the notifying section 12, the sending data generating section 13, the confirmation instruction receiving section 16, and the return control section 17. The selection receiving section 14 and the monitoring section 15 will be described later.

The sending control section 11 receives an instruction for executing facsimile communication, the instruction being input by a user via the operation section 23. The execution instruction of facsimile communication includes information concerning target sending image data directed for sending via the facsimile communication, and IP address information of the receiving IP facsimile apparatus 1. The information concerning the target sending image data includes, for example, information for instructing the image reading section 21 to acquire image data representing an image of a document, and information specifying an address of a storage area in the image memory 24 where the target sending image data is stored. The execution instruction of facsimile communication may include, in place of the IP address information of the receiving IP facsimile apparatus 1, information having a host name, a telephone number, or URI of the receiving IP facsimile apparatus 1, for example, as information concerning the receiving IP facsimile apparatus 1.

Upon receiving the execution instruction of facsimile communication, the sending control section 11 controls the communication control section 25 to send the target sending image data specified by the execution instruction to the receiving IP facsimile apparatus 1 specified by the execution instruction in accordance with the communication procedure based on the T.38.

In addition, the control section 11 performs a connection confirmation processing before causing the communication control section 25 to send the target sending image data. The connection confirmation processing includes controlling the communication control section 25 to send connection conformation data to the receiving IP facsimile apparatus 1, and determining whether reception information indicating reception of the connection confirmation data has been sent back from the receiving IP facsimile apparatus 1. The connection confirmation data is in advance stored in the image memory 24 or the like as image data for confirming connection. The connection confirmation data is image data of 1 Kbyte representing an image consisting of only pixels having pixel value "0". The reception information will be described in detail later.

After the connection confirmation processing is performed by the sending control section 11, the notifying section 12 displays on the display portion 231 a determination result of the connection confirmation processing executed by the sending control section 11. In the case that the determination result indicates that the reception information has been sent back from the receiving IP facsimile apparatus 1, the notifying section 12 further displays on the display portion 231 the identification information specifying the receiving IP facsimile apparatus 1 that is included in the reception information. The identification information specifying the receiving IP facsimile apparatus 1 included in the reception information will be described in detail later.

The sending data generating section 13 generates the target sending image data on the basis of the information concerning the target sending image data that is included in the execution instruction of facsimile communication which is received by the sending control section 11.

In the case that the information concerning the target sending image data included in the execution instruction is the information instructing the image reading section 21 to acquire image data representing an image of a document, the sending data generating section 13 causes the image reading section 21 to acquire the image data representing the image of the document, and sets the acquired image data as the target sending image data. On the other hand, in the case that the information concerning the target sending image data included in the execution instruction is the information specifying an address of a storage area in the image memory 24 where the target sending image data is stored, the sending data generating section 13 reads out image data stored in the storage area at the address of the image memory 24, and sets the read-out image data as the target sending image data.

When the identification information included in the reception information is displayed on the display portion 231 by the notifying section 12, the confirmation instruction receiving section 16 receives a confirmation instruction of the displayed identification information.

Specifically, when the identification information included in the reception information is displayed on the display portion 231 by the notifying section 12, the confirmation instruction receiving section 16 displays on the display portion 231 a first soft key indicating that the identification information is correct and a second soft key indicating that the identification information is incorrect. When the first soft key is touched through the touch panel function of the display portion 231, the confirmation instruction receiving section 16 receives a confirmation instruction specifying that the identification information is correct. On the other hand, when the second soft key is touched through the touch panel function, the confirmation instruction receiving section 16 receives a confirmation instruction specifying that the identification information is incorrect.

The return control section 17 comes into operation in the receiving IP facsimile apparatus 1. Specifically, the communication control section 25 receives the connection confirmation data sent from the sending IP facsimile apparatus 1, and the return control section 17 discards the received connection confirmation data without storing it in the image memory 24 and causes the communication control section 25 to send back the reception information indicating that the connection confirmation data has been received.

The reception information includes information indicating that the connection confirmation data has been received, and the identification information specifying the receiving IP facsimile apparatus 1. The identification information specifying the IP facsimile apparatus 1 includes, for example, information indicating a name of an owner of the IP facsimile apparatus 1, information indicating a local telephone number of the IP facsimile apparatus 1, and information indicating an IP address of the IP facsimile apparatus 1. The identification information specifying the IP facsimile apparatus 1 is input by a user via the operation section 23 and is stored in the non-volatile memory or the like in the initial setting up stage of the IP facsimile apparatus 1, for example.

Figure 3:
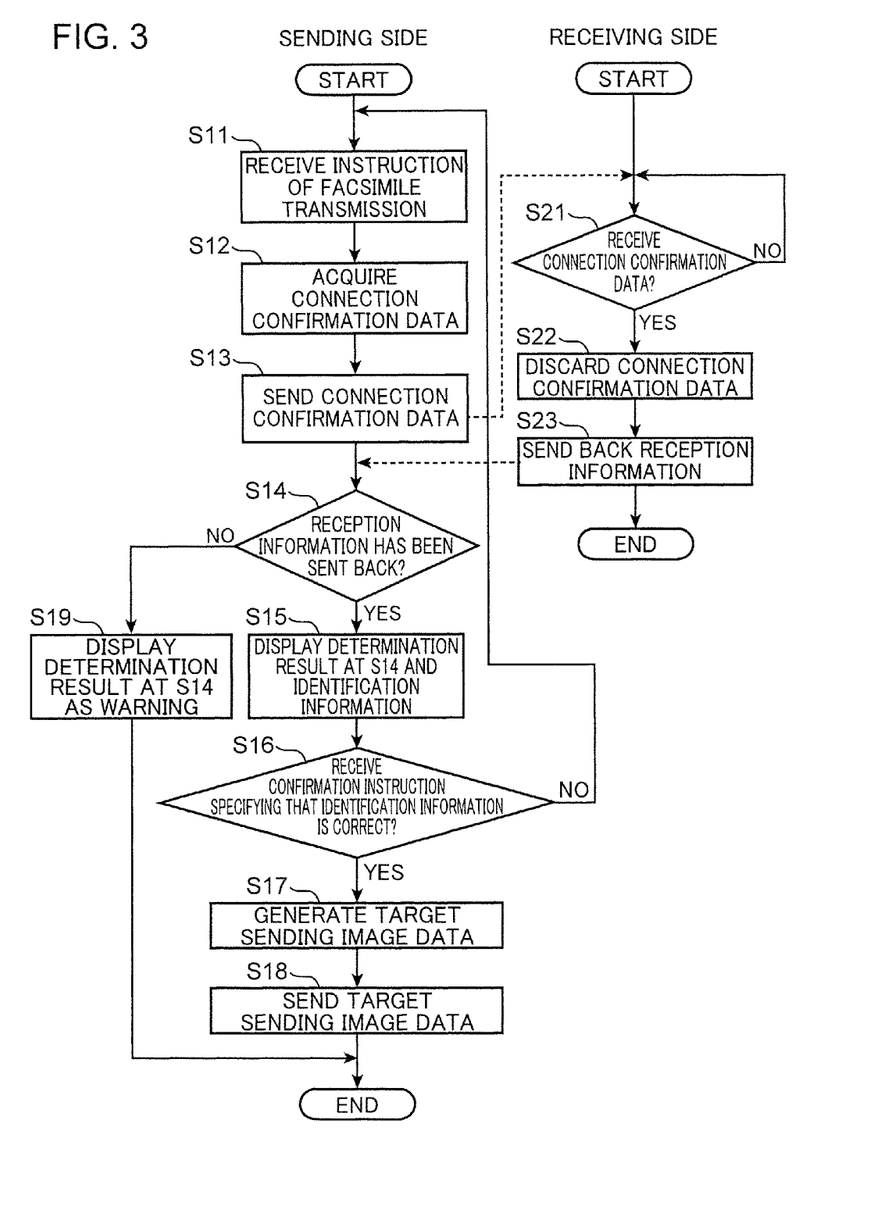
FIG. 3 is a flow chart showing operations performed when target sending image data is sent via facsimile communication.
Figure 4:
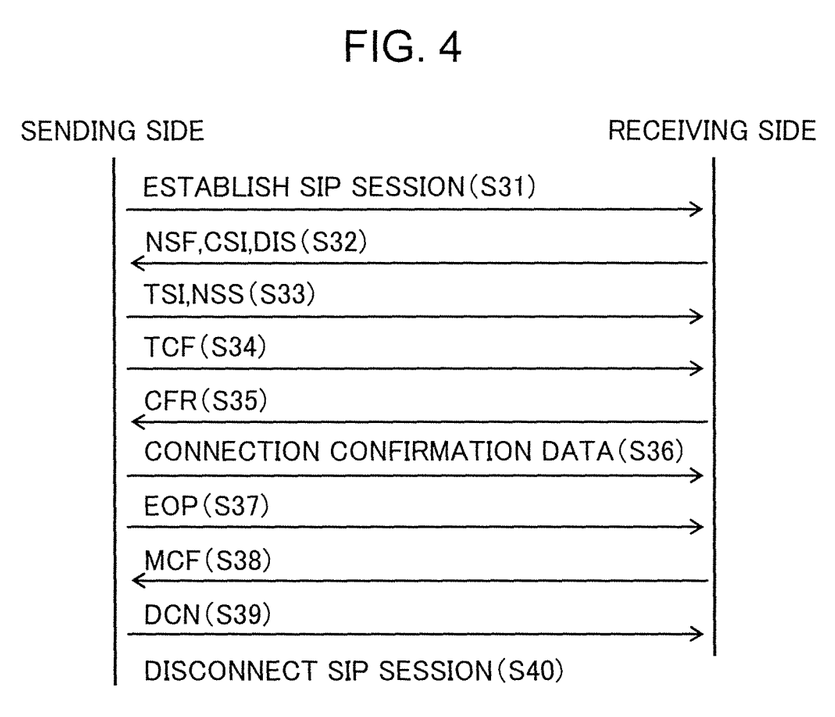
FIG. 4 is a diagram showing an operation of a connection confirmation processing.

Hereinafter, operations performed when the target sending image data is sent via facsimile communication will be described with reference to FIGS. 3 and 4. FIG. 3 is a flow chart showing the operations performed when the target sending image data is sent via facsimile communication. FIG. 4 is a diagram showing an operation of the connection confirmation processing.

As shown in FIG. 3, in the sending IP facsimile apparatus 1, the sending control section 11 starts, after receiving an execution instruction of facsimile communication (S11), the connection confirmation processing. First, the sending control section 11 acquires the connection confirmation data that is stored in the image memory 24 or the like in advance (S12). Then, the sending control section 11 controls the communication control section 25 to send the connection confirmation data acquired at step S12 to the receiving IP facsimile apparatus 1 specified by the execution instruction received at step S11 (S13).

In the receiving IP facsimile apparatus 1, after the communication control section 25 (receiving-side communication section) receives the connection confirmation data (S21; YES), the return control section 17 discards the received connection confirmation data without storing it in the image memory 24 (S22). Then, the return control section 17 controls the communication control section 25 to send back the reception information indicating that the connection confirmation data has been received (S23).

In the sending IP facsimile apparatus 1, the sending control section 11 determines whether the reception information has been sent back from the receiving IP facsimile apparatus 1 until a predetermined time has elapsed after the connection confirmation data was sent at step S13 (S14). Subsequently, the sending control section 11 ends the connection confirmation processing.

The sending processing of the connection confirmation data at step S13, the receiving processing of the connection confirmation data at step S21, the return processing of the reception information at step S23, and a receiving processing of the reception information at step S14 are realized by the facsimile communication between the communication control section 25 of the sending side and the communication control section 25 of the receiving side. The facsimile communication follows the communication procedure based on the T.38. In the following description, the connection confirmation data should be noted to be image data of 1 Kbyte representing an image consisting of only pixels having pixel value "0".

Specifically, as shown in FIG. 4, the communication control section 25 of the sending side first establishes a SIP (Session Initiation Protocol) session with the receiving IP facsimile apparatus 1 to perform the facsimile communication in the communication procedure based on the T.38, (S31).

After the SIP session is established, the communication control section 25 of the receiving side sends to the communication control section 25 of the sending side data packets which conform to the T. 38 and separately correspond to a NSF (Non-Standard Facilities) signal, a CSI (Called Subscriber Identification) signal, and a DIS (Digital Identification Signal) signal conforming to the ITU-T Recommendation T.30 (S32).

The NSF signal is a signal indicating information unique to a manufacturer of the IP facsimile apparatus 1. The CSI signal is a signal indicating a telephone number of the receiver. The DIS signal is a signal indicating standard information of a G3 (Group 3) facsimile apparatus that performs facsimile communication in accordance with a communication procedure based on the T.30 via a telephone network.

Specifically, the communication control section 25 of the receiving side sends, at step S32, data packets corresponding to the NSF signal which include information indicating a name of an owner of the receiving IP facsimile apparatus 1, the information having been stored in the non-volatile memory or the like. In addition, the communication control section 25 of the receiving side sends data packets corresponding to the CSI signal which include information indicating a local telephone number of the receiving IP facsimile apparatus 1, the information having been stored in the non-volatile memory or the like. In other words, those pieces of information that are included in the data packets corresponding to the NSF signal and in the data packets corresponding to the CSI signal are the identification information specifying the receiving IP facsimile apparatus 1, and are included in the reception information which the return control section 17 sends back.

On the other hand, the communication control section 25 of the sending side, after receiving the data packets separately corresponding to the NSF signal, the CSI signal, and the DIS signal, stores in the RAM or the like the information indicating the name of the owner of the receiving IP facsimile apparatus 1 that is included in the data packets corresponding to the NSF signal and the information indicating the local telephone number of the receiving IP facsimile apparatus 1 that is included in the data packets corresponding to the CSI signal.

Subsequently, the communication control section 25 of the sending side sends data packets separately corresponding to a TSI (Transmitting Subscriber Identification) signal and a NSS (Non-Standard Facilities Set-up) signal to the communication control section 25 of the receiving side (S33).

The TSI signal is a signal indicating a telephone number of the sender. The NSS signal is a signal indicating information unique to a manufacturer of the IP facsimile apparatus 1.

Specifically, the communication control section 25 of the sending side sends data packets corresponding to the TSI signal which include information indicating a local telephone number of the IP facsimile apparatus 1, the information having been stored in the non-volatile memory or the like, at step S33. In addition, the communication control section 25 of the sending side sends data packets corresponding to the NSS signal which include information indicating that the connection confirmation data in the form of image data of 1 Kbyte representing an image consisting of only pixels having pixel value "0" will be sent.

Subsequently, the communication control section 25 of the sending side sends data packets corresponding to a TCF (Training Check Field) signal to the communication control section 25 of the receiving side (S34). The TCF signal is used to test whether normal communication can be performed with the communication control section 25 of the receiving side.

The communication control section 25 of the receiving side receives the data packets corresponding to the TCF signal. If no error is found in the received data packets corresponding to the TCF signal, the communication control section 25 of the receiving side sends data packets corresponding to a CFR (Confirmation to Receive) signal to the communication control section 25 of the sending side, the CFR signal indicating that the data packets corresponding to the TCF signal have been normally communicated (S35).

The communication control section 25 of the sending side, after receiving the data packets corresponding to the CFR signal, sends data packets including the connection confirmation data to the communication control section 25 of the receiving side (S36). This sending processing may be said to be equivalent to the sending processing of the connection confirmation data at step S13.

After sending the data packets including the connection confirmation data, the communication control section 25 of the sending side sends data packets corresponding to an EOP (End Of Procedure) signal to the communication control section 25 of the receiving side (S37).

On the other hand, the communication control section 25 of the receiving side acquires image data included in the data packets that have been received after sending the data packets corresponding to the CFR signal and before receiving the data packets corresponding to the EOP signal. This acquiring processing may be said to be equivalent to the receiving processing of the connection confirmation data at step S21.

The communication control section 25 of the receiving side checks whether the acquired image data agrees with the connection confirmation data that is specified by the information included in the data packets corresponding to the NSS signal received at step S33. In other words, the communication control section 25 of the receiving side checks whether the acquired image data agrees with the image data of 1 Kbyte representing the image consisting of only pixels having pixel value "0". When the acquired image is confirmed to agree with the above-mentioned image data of 1 Kbyte, the communication control section 25 of the receiving side outputs the acquired image data to the main controller 10.

After the communication control section 25 of the receiving side outputs the image data to the main controller 10, the return control section 17 discards the image data without storing it in the memory 24. This discarding processing may be said to be equivalent to the discarding processing of the connection confirmation data at step S22.

In addition, when the acquired image data is confirmed to agree with the above-mentioned image data of 1 Kbyte, the communication control section 25 of the receiving side sends data packets corresponding to a MCF (Message Confirmation) signal to the communication control section 25 of the sending side, the MCF signal indicating that the connection confirmation data has been normally received (S38). In other words, the data packets corresponding to the MCF signal may be said to be equivalent to the information indicating that the connection confirmation data has been received that is included in the reception information which the return control section 17 sends back. This sending processing at step S38 may be said to be equivalent to the processing of sending back the reception information at step S23.

The communication control section 25 of the sending side receives the data packets corresponding to the MCF signal. This receiving processing may be said to be equivalent to the receiving processing of the reception information at step S14. After receiving the data packets corresponding to the MCF signal, the communication control section 25 of the sending side sends a DCN (Disconnect) signal to the communication control section 25 of the receiving side (S39) to disconnect the SIP session (S40). Consequently, the facsimile communication between the communication control section 25 of the sending side and the communication control section 25 of the receiving side that is in accordance with the communication procedure based on the T.38 ends.

Specifically, when the communication control section 25 of the sending side receives the data packets corresponding to the MCF signal, the sending control section 11 determines that the reception information has been sent back from the receiving IP facsimile apparatus 1, at step S14 (S14; YES). On the other hand, when the communication control section 25 of the sending side does not receive the data packets corresponding to the MCF signal in the elapse of the predetermined time after the starting point of step 31, the sending control section 11 determines that the reception information has not been sent back from the receiving IP facsimile apparatus 1, at step S14 (S14; NO).

Now we return to FIG. 3, when the sending control section 11 determines that the reception information has not been sent back from the receiving IP facsimile apparatus 1 at step S14 (S14; NO), the notifying section 12 displays on the display portion 231 a representation meaning that the facsimile communication may not be able to be performed normally, for example, because the information indicating reception of the connection confirmation data has not been sent back from the receiving IP facsimile apparatus 1. In this manner, the notifying section 12 displays the determination result of step S14 on the display portion 231 (S19) as warning.

On the other hand, when the sending control section 11 determines that the reception information has been sent back from the receiving IP facsimile apparatus 1 at step S14 (S14; YES), the notifying section 12 displays on the display portion 231 a representation meaning that the facsimile communication can be performed normally, for example, because the information indicating reception of the connection confirmation data has been sent back from the receiving IP facsimile apparatus 1. In this manner, the notifying section 12 displays the determination result of step S14 on the display portion 231. Furthermore, the notifying section 12 displays on the display portion 231 the identification information specifying the receiving IP facsimile apparatus 1 that has been received by the communication control section 25 and stored in the RAM or the like at step S32 (S15).

Subsequently, when the confirmation instruction receiving section 16 receives a confirmation instruction specifying that the identification information is correct (S16; YES), the sending data generating section 13 generates target sending image data in accordance with the information concerning the target sending image data that is included in the execution instruction of facsimile communication received at step S11 (S17). Thereafter, the sending control section 11 controls the communication control section 25 to send the target sending image data generated at step S17 to the receiving IP facsimile apparatus 1 which has been directed by the execution instruction received at step S11 (S18).

On the other hand, when the confirmation instruction receiving section 16 receives a confirmation instruction specifying that the identification information is incorrect (S16; NO), the operation returns to step S11. This allows a user to input an execution instruction of facsimile communication again.

In this manner, in the above embodiment, the connection confirmation data in the form of image data for confirming connection is sent to the receiving IP facsimile apparatus 1 before the target sending image data is sent. Thereafter, the notifying section 12 displays on the display portion 231 a determination result on whether the reception information indicating reception of the connection confirmation data has been sent back from the receiving IP facsimile apparatus 1.

This allows the user to see the determination result displayed on the display portion 231 by the notifying section 12 to thereby judge whether the image data will be correctly received by the receiving IP facsimile apparatus 1, before sending the target sending image data. This will keep the user from moving away from the IP facsimile apparatus 1 after inputting the execution instruction of facsimile communication without judging whether the target sending image data will be correctly received by the receiving IP facsimile apparatus 1, in spite of a situation where a failure occurs in the IP network 3 to cause the sending of image data to the receiving IP facsimile apparatus 1 to be impossible.

If the determination result of step S14 indicates that the reception information has not been sent back, the target sending image data is not generated. This makes it possible to avoid wasteful generation of target sending image data under a situation where the connection confirmation data is not received by the receiving IP apparatus, in other words, there is likelihood that the facsimile communication cannot be performed normally.

Further, when the determination result of step S14 indicates that the reception information has been sent back, the determination result and the identification information specifying the receiving IP facsimile apparatus 1 are displayed on the display portion 231 at step S15. This allows the user to visually recognize the identification information to thereby check whether the user has incorrectly specified the receiving IP facsimile apparatus 1. In addition, this provides the user with an operation of inputting a confirmation instruction concerning whether the displayed identification information is correct. The confirmation instruction is received by the confirmation instruction receiving section 16. Therefore, it is possible for the user to send the target sending image data after inputting the confirmation instruction specifying that the displayed identification information is correct. It is also possible for the user to input an instruction for executing facsimile communication again after inputting the confirmation instruction specifying that the displayed identification information is incorrect.

On the other hand, in the receiving IP facsimile apparatus 1, after the connection confirmation data sent from the sending IP facsimile apparatus 1 is received in the connection confirmation processing, the return control section 17 discards the received connection confirmation data. This makes it possible to avoid a wasteful storage of image data in the image memory or the like in the receiving IP facsimile apparatus 1.

The configurations and operations shown in FIGS. 1 to 4 are merely illustration of the embodiments according to the present disclosure, and the present disclosure is not limited by the above embodiments.

(1) For example, the main controller 10 may be provided with a selection receiving section 14 (FIG. 2). The selection receiving section 14 receives an instruction concerning a selection as to whether or not the connection confirmation processing should be performed in the sending control section 11.

Specifically, the selection receiving section 14 displays on the display portion 231 a third soft key for allowing input of an instruction for proceeding the connection confirmation processing of the sending control section 11, and a fourth soft key for allowing input of an instruction for suspending the connection confirmation processing the sending control section 11. When the third soft key is touched by a user through the touch panel of the display portion 231, the selection receiving section 14 receives the instruction for proceeding the connection confirmation processing of the sending control section 11. On the other hand, when the fourth soft key is touched by a user through the touch panel, the selection receiving section 14 receives the instruction for suspending the connection confirmation processing of the sending control section 11.

When the instruction for suspending the connection confirmation processing of the sending control section 11 is received, the sending control section 11 does not perform the connection confirmation processing, in other words, does not execute the operations of steps S12 to S14 (FIG. 3). Furthermore, the notifying section 12 does not execute the operations of steps S15 and S19. In the receiving IP facsimile apparatus 1, the return control section 17 of the main controller 10 does not come into operation, in other words, does not execute the operations of steps S21 to S23. On the other hand, when the instruction for proceeding the connection confirmation processing of the sending control section 11 is received, the main controller 10 operates in the same manner as in the above embodiment.

As described above, this modified embodiment allows the user to select whether or not to proceed the connection confirmation processing of the sending control section 11. Therefore, in the case of successively performing the facsimile communication with the same IP facsimile apparatus 1 as the directed receiving apparatus of the facsimile communication, no other performing the connection confirmation processing are needed than at the first facsimile communication, thereby realizing efficient facsimile communication.

(2) The main controller 10 may be further provided with a monitoring section 15 (FIG. 2). The monitoring section 15 monitors a communication load for the IP network 3. In combination with this monitoring, the sending control section 11 changes the size of the connection confirmation data according to the communication load monitored by the monitoring section 15.

Specifically, after the execution instruction of facsimile communication is received at step S11 (FIG. 3), the monitoring section 15 executes a PING command in which the IP address information of the receiving IP facsimile apparatus 1 included in the execution instruction is used as a parameter. The monitoring section 15 obtains a communication time for the receiving IP facsimile apparatus 1 on the basis of an execution result of the PING command. The monitoring section 15 stores in the RAM or the like the obtained communication time as an indicator of the communication load for the IP network 3.

At step S12 (FIG. 3), the sending control section 11 compares a predetermined communication time that is obtained based on results of trial operations and stored in the non-volatile memory or the like in advance with the communication time for the receiving IP facsimile apparatus 1 that is stored in the RAM or the like by the monitoring section 15.

If the communication time stored in the RAM or the like by the monitoring section 15 is determined to be longer than the predetermined communication time, the sending control section 11 reduces the size of the confirmation connection data according to the ratio of the communication time for the receiving IP facsimile apparatus 1 to the predetermined communication time. In other words, the sending control section 11 reduces the number of pixels of the image serving as the connection confirmation data.

On the other hand, if the communication time stored in the RAM or the like by the monitoring section 15 is determined to be shorter than the predetermined communication time, the sending control section 11 does not change the size of the connection confirmation data.

As described above, in this modified embodiment, the size of the connection confirmation data is changed according to the communication load for the IP network 3. Therefore, the time required for transmitting the connection confirmation data in the connection confirmation processing is changed according to the communication load for the IP network 3. In this manner, the time required for the connection confirmation processing is allowed to be changed according to the communication load for the IP network 3.

(3) The notifying section 12 may, at step S15 (FIG. 3), calculate a communication speed of the communication with the receiving IP facsimile apparatus 1 on the basis of the time required for transmitting the connection confirmation data and the size of the connection confirmation data, and calculate a transmission time of the target sending image data on the basis of the calculated communication speed, and notify the calculated transmission time.

Specifically, the notifying section 12 measures a time from the start of the connection confirmation processing by the sending control section 11 at step S12 (FIG. 3) to the end of the connection confirmation processing at step S14 (FIG. 3). The notifying section 12 stores in the RAM or the like the measured time as the time required for transmitting the connection confirmation data.

Alternatively, the communication control section 25 of the receiving IP facsimile apparatus 1 may, at step S32 (FIG. 4), put in the data packets corresponding to the NSF signal the point of time that the operation at step S32 is executed. In combination with this, the sending control section 11 may store in the RAM or the like a time difference between the point of time that the communication control section 25 receives the data packets corresponding to the MCF signal at step S38 (FIG. 4) and the point of time included in the data packets corresponding to the NSF signal which the communication control section 25 receives at step S32, as the time required for transmitting the connection confirmation data.

Alternatively, the sending control section 11 may measure a time from the reception of the data packets corresponding to the NSF signal by the communication control section 25 at step S32 (FIG. 4) to the reception of the data packets corresponding to the MCF signal by the communication control section 25 at step S38 (FIG. 4), and store in the RAM or the like the measured time as the time required for transmitting the connection confirmation data.

Subsequently, at step S15 (FIG. 3), the notifying section 12 performs division of the size of the connection confirmation data by the time required for transmitting the connection confirmation data stored in the RAM or the like to thereby obtain a division result as the communication speed.

In the case that the information concerning the target sending image data included in the execution instruction received at step S11 (FIG. 3) is the information specifying an address of a storage area in the image memory 24 where the target sending image data is stored, the notifying section 12 performs multiplication of the size of the image data stored in the storage area at the specified address of the image memory 24 by the above calculated communication speed, and displays on the display portion 231 the multiplication result as the time required for transmitting the target sending image data.

On the other hand, in the case that the information concerning the target sending image data included in the execution instruction received at step S11 (FIG. 3) is the information instructing the image reading section 21 to acquire image data representing an image of a document, the notifying section 12 causes the image data reading section 21 to acquire the image data representing the image of the document, and performs multiplication of the size of the acquired image data by the above calculated communication speed, and displays on the display portion 231 the multiplication result as the time required for transmitting the target sending image data. In this case, step S17 (FIG. 3) may be skipped because the notifying section 12 causes the image reading section 21 to acquire the target sending image data.

Specifically, in this modified embodiment, the transmission time of the target sending image data is displayed on the display portion 231 before sending the target sending image data. This allows a user to recognize the transmission time of the target sending image data before sending the target sending image data. Accordingly, for example, when the transmission time is judged to be long, facsimile communication or other operation can be performed in another time zone in which the communication load for the IP network 3 is considered to be low. This will improve the convenience of facsimile communication.

(4) In each of the above embodiments, the communication control section 25 of the receiving side may, at step S32 (FIG. 4), send the data packets corresponding to the NSF signal without including the information indicating the name of the owner of the receiving IP facsimile apparatus 1. In similar manner, the communication control section 25 of the receiving side may, at step S32, send the data packets corresponding to the CSI signal without including the information indicating the local phone number of the receiving IP facsimile apparatus 1. In other words, the return control section 17 may send back the reception information without including the identification information specifying the receiving IP facsimile apparatus 1. In combination with this, the notifying section 12 may be simplified so as not to display on the display portion 231 the identification information specifying the receiving IP facsimile apparatus 1 at step S15 (FIG. 3). Furthermore, the main controller 10 may be simplified so as not to have the confirmation instruction receiving section 16 to thereby skip step S16 (FIG. 3).

(5) In each of the above embodiments, after the sending control section 11 determines that the reception information has been sent back at step S14 (FIG. 3), the sending data generating section 13 generates target sending image data at step S17 (FIG. 3). However, the sending data generating section 13 may, alternatively, generate target sending image data after the operation of step S11 (FIG. 3) is executed and before the sending control section 11 determines whether the reception information has been sent back at step S14 (FIG. 3).

(6) The notifying section 12 may notify a user of determination result at step S14 (FIG. 3) and identification information specifying the receiving IP facsimile apparatus 1 by outputting sounds representing the determination result and the identification information from an unillustrated speaker.

The present disclosure as described above makes it possible for a user to confirm whether image data will be received by a receiving communication apparatus in facsimile communication via an IP network.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. A communication apparatus, comprising:
a receiving-side communication section that performs facsimile communication with a sending communication apparatus by way of an IP network;
wherein the sending communication apparatus includes:
a communication control section that performs facsimile communication with the communication apparatus by way of the IP network;
an image memory that stores connection confirmation data for confirming connection with the communication apparatus, the connection confirmation data comprising first image data representing a first image including pixels each having a predetermined pixel level; and
a sending control section that performs connection confirmation processing to confirm a connection with the communication apparatus;
wherein the connection confirmation processing includes an operation of controlling the communication control section to send the connection confirmation data to the communication apparatus;
wherein the connection confirmation processing further includes an operation of determining whether reception information indicating reception of the connection confirmation data has been received from the communication apparatus;
wherein, upon determining that the reception information has been received, the sending control section controls the communication control section to transmit second image data representing a second image including an image of a document to the communication apparatus via the facsimile communication,
the communication apparatus further comprising:
a return control section that, in a case where the receiving-side communication section receives the connection confirmation data sent from the sending communication apparatus after the receiving-side communication section receives an NSS information that is sent from the sending communication apparatus and indicates that the connection confirmation data including the first image data is to be sent, discards the connection confirmation data and causes the receiving-side communication section to send the reception information under the condition that the connection confirmation data received by the receiving-side communication section agrees with the first image data that is specified by the NSS information received by the receiving-side communication section.

2. A communication apparatus according to claim 1, wherein the sending communication apparatus further includes a sending data generating section which generates the second image data, wherein the sending control section causes the sending data generating section to generate the second image data, after determining from the connection confirmation processing that the reception information has been received.

3. A communication apparatus according to claim 1, wherein the sending communication apparatus further includes a selection receiving section which receives an instruction concerning a selection as to whether or not the connection confirmation processing should be performed in the sending control section.

4. A communication apparatus according to claim 1, wherein the sending communication apparatus further includes a monitoring section which monitors a communication time of a communication performed between the communication control section and the receiving communication apparatus by way of the IP network, wherein the sending control section reduces the size of the first image data if the communication time is longer than a predetermined communication time.

5. A communication apparatus according to claim 1, wherein the sending communication apparatus further includes a notifying section that displays a result of the connection confirmation processing performed by the sending control section.

6. A communication apparatus according to claim 5, wherein the notifying section calculates a communication speed of the communication with the receiving communication apparatus on the basis of a time required for transmitting the connection confirmation data and the size of the connection confirmation data, calculates a transmission time for the second image data on the basis of the communication speed, and displays the calculated transmission time.

7. A communication apparatus according to claim 5, wherein
the reception information includes identification information specifying the receiving communication apparatus;
the notifying section further notifies the identification information;
the communication apparatus further comprising a confirmation instruction receiving section which receives a confirmation instruction for confirming the notified identification information;
wherein the sending control section sends the second image data when the confirmation instruction receiving section receives the confirmation instruction.

8. A communication system, comprising:
a sending communication apparatus that includes:
- a communication control section that performs facsimile communication with a receiving communication apparatus by way of an IP network;
- an image memory that stores connection confirmation data for confirming connection with the receiving communication apparatus, the connection confirmation data comprising first image data representing a first image including pixels each having a predetermined pixel level; and
- a sending control section that performs connection confirmation processing to confirm a connection with the receiving communication apparatus, the connection confirmation processing including: an operation of controlling the communication control section to send the connection confirmation data to the receiving communication apparatus; and an operation of determining whether reception information indicating reception of the connection confirmation data has been received from the receiving communication apparatus;
- wherein, upon determining that the reception information has been received, the sending control section controls the communication control section to transmit second image data representing a second image including an image of a document to the receiving communication apparatus via the facsimile communication; and the communication system further comprises:

a receiving communication apparatus that includes:
- a receiving-side communication section that performs facsimile communication with the sending communication apparatus by way of the IP network; and
- a return control section which, in the case that the receiving-side communication section receives the connection confirmation data sent from the sending communication apparatus after the receiving-side communication section receives an NSS information that is sent from the sending communication apparatus and indicates that the connection confirmation data including the first image data is to be sent, discards the connection confirmation data and causes the receiving-side communication section to send the reception information under the condition that the connection confirmation data received by the receiving-side communication section agrees with the first image data that is specified by the NSS information received by the receiving-side communication section.

9. A communication apparatus according to claim 1, wherein the sending control section determines whether the reception information is sent back until a predetermined time elapses after the connection confirmation data is sent in the connection confirmation processing.

10. A communication apparatus according to claim 1, wherein the pixels of the first image each includes the same pixel value.

* * * * *